US008970665B2

(12) United States Patent
Yang et al.

(10) Patent No.: US 8,970,665 B2
(45) Date of Patent: Mar. 3, 2015

(54) ORIENTATION-BASED GENERATION OF PANORAMIC FIELDS

(75) Inventors: William X. Yang, Sammamish, WA (US); Dahey Yoo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 252 days.

(21) Appl. No.: 13/115,651

(22) Filed: May 25, 2011

(65) Prior Publication Data

US 2012/0300019 A1    Nov. 29, 2012

(51) Int. Cl.
- H04N 7/00 (2011.01)
- H04N 5/232 (2006.01)
- H04N 5/76 (2006.01)
- G03B 17/18 (2006.01)

(52) U.S. Cl.
CPC ............ *H04N 5/23232* (2013.01); *H04N 5/76* (2013.01); *G03B 17/18* (2013.01); *H04N 5/23238* (2013.01)
USPC ...................................... 348/36; 348/231.99

(58) Field of Classification Search
CPC ............ H04N 5/76; H04N 7/00; H04N 5/92; G03B 17/18; G06K 9/32; G06K 9/00
USPC ..................... 348/36, 37, 335, 607, 586, 284, 348/E05.077, E07.001, E13.074, 231.99, 348/231.8, 207.2, 231.3, E05.031, 207.1; 396/20–70, 85–148, 287, 322, 429; 382/181, 294, 154, 284, 293; 345/156, 345/173, 640, 628; 359/872, 863; 386/36, 386/46
See application file for complete search history.

(56) References Cited

U.S. PATENT DOCUMENTS

| | | | |
|---|---|---|---|
| 5,140,416 A | 8/1992 | Tinkler | |
| 6,078,701 A * | 6/2000 | Hsu et al. | 382/294 |
| 6,304,284 B1 * | 10/2001 | Dunton et al. | 348/36 |
| 6,459,821 B1 * | 10/2002 | Cullen | 382/294 |
| 6,792,165 B1 * | 9/2004 | Silverbrook et al. | 382/314 |

(Continued)

OTHER PUBLICATIONS

Baudisch, et al., "An exploration of user interface designs for real-time panoramic photography", Retrieved at <<http://research.microsoft.com/pubs/64298/ajis2006-panoramicphotography.pdf>>, Australasian Journal of Information Systems, vol. 13, No. 2, May 2006, pp. 151-166.

(Continued)

*Primary Examiner* — Dave Czekaj
*Assistant Examiner* — Dramos I Kalapodas
(74) *Attorney, Agent, or Firm* — Bryan Webster; Kate Drakos; Micky Minhas

(57) ABSTRACT

A field sensor may be capable of generating a panoramic field, e.g., by instructing the user to capture a sequence of fields of the panorama, performing a field evaluation to identify one or more landmarks depicted in overlapping areas of two contiguous fields, performing a field registration therebetween, and stitching together the panoramic field. However, panoramic field stitching based on field evaluation may fail to register two fields accurately or at all. Rather, panoramic field stitching may be performed using a device having an orientation sensor that detects the orientation of the device while capturing each field with a field sensor. The detected orientation may be used to orient the fields within a projection, from which a panoramic field may be accurately stitched. Additional variations include stitching together projections of the panorama captured at different times and utilizing fields captured at a distance from the root location of the panorama.

20 Claims, 9 Drawing Sheets

(56) References Cited

U.S. PATENT DOCUMENTS

| | | | |
|---|---|---|---|
| 7,058,239 | B2 | 6/2006 | Singh et al. |
| 2001/0045986 | A1* | 11/2001 | Edwards ..................... 348/239 |
| 2003/0026588 | A1* | 2/2003 | Elder et al. .................... 386/46 |
| 2005/0008355 | A1* | 1/2005 | Sato et al. ..................... 396/54 |
| 2005/0057563 | A1* | 3/2005 | Shum et al. .................. 345/419 |
| 2007/0025723 | A1* | 2/2007 | Baudisch et al. ............ 396/287 |
| 2007/0031062 | A1* | 2/2007 | Pal et al. ...................... 382/284 |
| 2007/0270689 | A1 | 11/2007 | Lothert |
| 2008/0180550 | A1* | 7/2008 | Gulliksson .............. 348/231.99 |
| 2010/0097433 | A1* | 4/2010 | Mukai et al. ................... 347/93 |
| 2010/0149183 | A1* | 6/2010 | Loewke et al. .............. 345/424 |
| 2010/0172586 | A1* | 7/2010 | Sorek et al. .................. 382/181 |
| 2012/0242844 | A1* | 9/2012 | Walker et al. .............. 348/207.1 |

OTHER PUBLICATIONS

Liu, et al., "Panoramic images automatically stitching algorithm introduction", Retrieved at <<http://www.ccsenet.org/journal/index.php/cis/article/viewFile/1191/1153>>, Computer and Information Science, vol. 1. No. 4, Nov. 2008, pp. 179-182.

Shacklock, et al., "Real-time fusion of images for visualisation of micro-manipulation tasks", Retrieved at <<http://www.simtech.a-star.edu.sg/Research/TechnicalReports/tech-report20052/STR__V6__N2__05__Shacklock.pdf>>, SIMTech technical reports, vol. 6, No. 2, Jul.-Sep. 2005, pp. 23-28.

* cited by examiner

ORIENTATION-BASED GENERATION OF PANORAMIC FIELDS

BACKGROUND

Within the field of sensors, many scenarios involve the generation of a panoramic fields, such as merging a sequence of images captured by a camera that together depict a panoramic image of a landscape. Other domains in the field of sensors may also result in the generation of a panoramic field comprising an aggregation of fields captured by a sensor across a panorama of a physical space, such as a panoramic sonogram captured by a sonar sensor or a thermal panorama indicating temperatures captured by a thermal detector.

A user may generate a panoramic field by capturing a series of fields, and then manually aligning the sequence of fields to form a projection. Sensors may also assist the user in generating a panoramic field, e.g., by instructing the user to capture a particular sequence of fields, and then applying a landmark-based alignment technique to register respective fields. For example, the sensor may instruct the user to begin capturing fields from the one edge to the other edge of the panorama, and may then endeavor to align the edges of consecutive fields through the application of various field evaluation techniques, e.g., by comparing an edge of each field with the corresponding edge of the next field (e.g., instructing the user to capture a sequence of fields in a horizontal sequence from the right edge of the panorama to the left edge of the panorama, and then endeavoring to align the left edge of each field with the right edge of the succeeding field). This alignment may involve comparing the contents of the corresponding edges, and seeking to identify one or more landmarks depicted in both fields that indicate the degree of overlap of the fields. For example, if the data comprising respective fields is represented as visual data, the landmarks may comprise discernible high-contrast edges, distinctive shapes, or discrete bright or dark spots that may be identified in respective fields and overlapped to identify the relative alignment of the fields. The sensor may also assist the user in capturing the fields, e.g., by displaying an edge of a preceding field in the margin of the LCD viewfinder, thereby enabling the user to align the current field with respect to the preceding field. The fields may then be "stitched" by overlapping consecutive fields based on the corresponding landmarks and trimming the fields into a panoramic field.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The generation of a panoramic field based on field evaluation techniques (e.g., the identification of landmarks in an overlapping area of two consecutive fields) may be adequate in some circumstances, but may be inadequate in others. As a first example, such techniques may fail to identify an overlapping area of two consecutive fields if suitably distinct landmarks are not identified. As a second example, such techniques may be unable to align consecutive fields that have been captured with little to no overlap, or between which lays a gap comprising an uncaptured portion of the panorama. Such gaps or failures may result in a break in the automatically generated panoramic field (e.g., for a panoramic image captured by a camera as five images, a gap between the second and third images may result in a two-image portion of the panorama and a three-image portion of the panoramic image). As a third example, such techniques may incorrectly register two fields based on two different landmarks that appear within different fields, but that are near each other and appear similar (e.g., two visually represented fields may be incorrectly aligned based on landmarks appearing in each field that coincidentally have a similar size and shape). As a fourth example, such techniques may be unable to align fields that are not captured in an anticipated sequence. For example, if the evaluation techniques anticipate a sequence of fields captured in a right-to-left horizontal sequence, but the user captures the fields in a left-to-right horizontal sequence or in a vertical sequence, the evaluation technique may be unable to identify the sequential layout of the fields to generate a panoramic field, or may do so only with a significant consumption of computing resources (e.g., a full-field analysis of each field and a comparison of the entire contents of each field with the entire contents of each other field to achieve an accurate registration of field).

Presented herein are techniques for stitching together field captured with a field sensor to form a panoramic field. These techniques involve capturing the fields on a device that includes an orientation sensor, such as a compass, gyroscopic sensor, or a set of accelerometers, that is capable of detecting the orientation of the device with respect to various reference points (e.g., magnetic north or a horizontal or vertical plane). Many contemporary devices incorporate such orientation sensors in order to provide various capabilities, e.g., in order to detect a heading or facing of an individual following a route, an attitude of a vehicle, or a tilting of a portable device.

In accordance with the techniques presented herein, a device that is equipped with an orientation sensor may, upon the field sensor capturing a field, detect the orientation of the device, and may store the detected orientation with the field in a memory component. When the individual later requests to generate a panoramic field from one or more fields, the device may first generate a projection, such as a flat plane, a curved plane, or a sphere, within which respective fields may be oriented. Using the orientation of each field, the device may orient the field within the projection (e.g., identifying the portion of the projection that each field depicts), and may stitch together a panoramic field based on the projection.

Additional variations may provide further advantages to orientation-based techniques for stitching together panoramic fields. As a first example, the device may utilize other registration techniques (e.g., landmark evaluation) to refine and/or correct errors in the orientation-based projection. As a second example, the panoramic field may comprise a single, static field, or may comprise multiple fields (e.g., fields of the panorama at different zoom levels or different times) and/or a sequence of fields comprising a panoramic video. As a third example, respective fields may be captured from different field sensors, and/or may be adjusted to match field properties with other fields (e.g., cropping the borders of a field or adjusting a white balance, contrast, or zoom level to match a contiguous field) and/or to match a dimensional property of the projection (e.g., applying a geometric transformation to render a flat field as part of a curved surface, such as a spherical projection). Many such variations of orientation-based generation of panoramic fields are presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent

DETAILED DESCRIPTION

Figure 1:
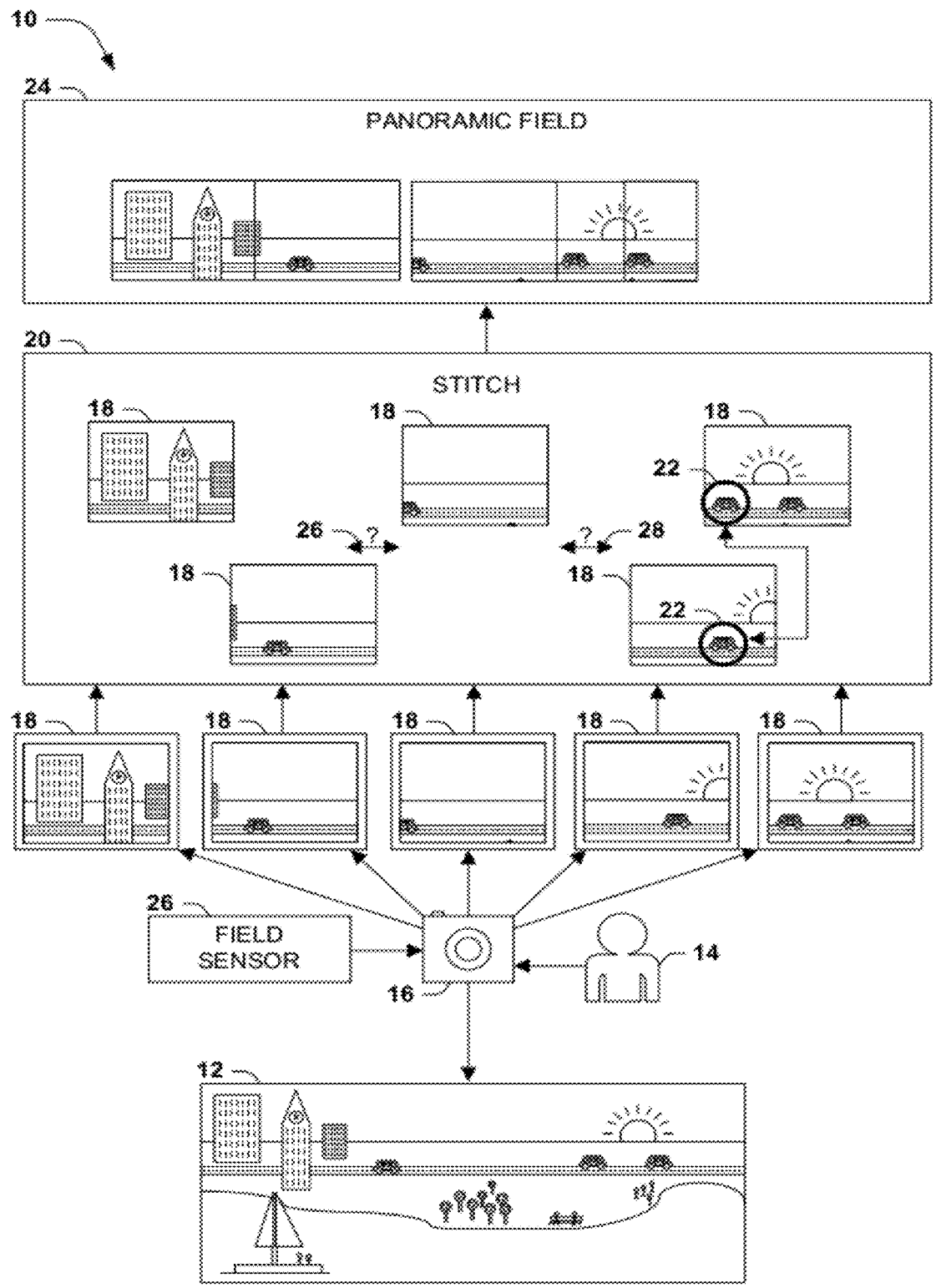
FIG. 1 is an illustration of an exemplary scenario featuring the generation of a panoramic field from a set of fields.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of imaging, many scenarios involve the generation of a panoramic field by combining several fields capturing portions of a panorama. For example, a user may wish to capture a scenic view that is too expansive to be captured in one field. Instead, the user may therefore capture several fields that each depicts a portion of the panorama, and later endeavor to generate a panoramic field through a manual overlaying of the fields in a field manipulation utility. Alternatively, a field evaluation technique may be utilized that identifies, among the set of fields to be combined into the panoramic fields, one or more landmarks that are depicted in two or more fields. These fields may then be "registered" (e.g., the relative position and degree of overlap of the two fields) with respect to one another based on the positions, sizes, and orientations of the landmark in each field. The field evaluation technique may therefore "stitch" together the panorama by registering each field in the set with respect to at least one other field. Some complications may arise in this process; e.g., fields typically present a flat snapshot of a depicted subject, while a panorama is typically curved to represent a spherical field, resulting in a "fish-eye" depiction of the panorama having an uneven warping of the panorama among various fields.

A field sensor may be configured to facilitate the capturing of fields. For example, when the user requests a capturing of a panorama, the field sensor may instruct the user to orient the field sensor one edge of a panorama (e.g., the right edge), and to capture fields successively across the panorama (e.g., incrementally rotating the field sensor across the panorama to the left edge). The field sensor may then identify the fields as a field set that are to be combined to form a panoramic field of the panorama. This grouping of fields may be provided to a post-processing service (e.g., a field manipulation service stored on a computer in communication with the field sensor) for stitching into a panoramic field. Alternatively, the field sensor may endeavor to generate the panoramic field from the fields; while this implementation may consume the resources of the field sensor (e.g., a significant consumption of memory, processing power, and/or battery charge), the presentation of the panoramic field to the user in the field may enable the user to examine the quality of the panoramic field and determine whether to re-shoot the panorama. Field sensors may also include additional features to assist in the generation of a panoramic field. For example, when the user is preparing to capture each field in the panorama, the field sensor may display (e.g., at the margin of the viewfinder) a trailing edge of the preceding field in the sequence of fields. This presentation may enable the user to align the edge of the current field with the displayed edge of the preceding field. Alternatively, the field sensor may display the trailing portion within an edge of the viewfinder, but with a semi-transparent appearance. This presentation may enable the user to align the current field such that landmarks appearing in the current field overlap corresponding landmarks appearing in the preceding field. These features may enable the user to capture sufficiently oriented and aligned fields to generate a complete panoramic field.

FIG. 1 presents an illustration of an exemplary scenario 10 featuring a panorama 12 that a user 14 seeks to capture with a device 16 having a field sensor 26. In this exemplary scenario 10, the panorama 12 features many visual elements, and is too large to be captured in a single field 18. Instead, the user 14 may capture a series of fields 18, each depicting a portion of the panorama 12. The user 14 may choose to capture such fields 18 in an arbitrary manner (e.g., capturing fields 18 of the panorama 12 in a random order), or in a particular sequence (e.g., capturing consecutive fields 18 in a left-to-right sequence across a horizontal axis of the panorama 12). Additionally, the user 14 may capture the fields 18 as a series of photographs using a static field sensor, or as frames of a video clip using a videocamera. In any of these scenarios, the user 14 may seek to perform a stitching 20 of the fields 18 to generate a panoramic field 24 using various field analysis techniques. For example, for each field 18, one or more landmarks 22 may be identified, comprising an area or element of the field 18 that is distinctly identified by shape, size, or contrast with surrounding areas or elements. Moreover, if the same landmark 22 is identified in two or more fields 18, the fields 18 may be registered with respect to one another; e.g., the relative positions of the landmark 22 in a first field and a second field may indicate the relative orientations of the fields 18 with respect to the panorama 12. For example, in the exemplary scenario 10 of FIG. 1, a landmark 22 comprising an automobile appears in a right portion of a fourth field 18, and also in a left portion of a fifth field 18. The relative positions of this landmark 22 indicate that the fourth field 18 is oriented to the left of the fifth field 18 (as further substantiated by a comparison of the visual elements surrounding the landmark 22). By registering each field 18 of the panoramic field set with at least one other field 18, and by overlapping the fields 18 according to the landmarks 22, the stitching 20 may result in the generation of a panoramic field 24 depicting the panorama 12. It may be appreciated that while this exemplary scenario 10 depicts a camera configured to stitch together images into a panoramic image, the techniques depicted herein are applicable to many types of devices 16 utilizing many types of field sensors 26 to generate panoramic fields 24 from a set of fields 18.

While the stitching together of fields 18 to generate a panoramic field 24 of a panorama 12 may be performed through field evaluation techniques, these techniques may result in disadvantages in some scenarios. As a first example, field evaluation techniques may be incapable of aligning two fields 18 if a gap exists therebetween. Even a small gap, or an insufficient overlap, may result in a registration failure and a break in the panoramic field 24. For example, in the exemplary scenario 10 of FIG. 1, a second field 18 and a third field 18 share a large degree of overlap (e.g., the only discernible landmark 22 of an automobile is positioned in the left portion of both fields 18, and is only half-visible in the third field 18), and the field evaluation technique may have difficulty 26 determining with confidence the registration of the fields 18 based on the landmark 18. As a result, the panoramic field 24 so generated may comprise a first portion comprising the two left fields 18 and a second portion comprising the three right fields 18, without a joining of these portions into a full panoramic field 24. As a second example, a problem may arise in registering fields 18 that depict a comparatively featureless portion of the panorama 12, such as a portion of open sky having few distinguishing landmarks 22. For example, in the exemplary scenario 10 of FIG. 1, the registration of the third field 18 with the fourth field 18 is made difficult by the absence of landmarks 22 appearing along the visible road and horizon; e.g., many points of registration along a large range of overlapping (e.g., from no overlap between the two fields 18 to an 80% overlap between the two fields 18) may be valid according to the field evaluation technique. Thus, the stitching 20 may have difficulty 28 aligning the third field 18 and the fourth field 18, and the panoramic field 24 may incorrectly stretch and/or collapse the combination of these fields 18 (e.g., resulting in an incorrectly shortened stretch of road separating the first and second automobiles).

Additional disadvantages may also arise from stitching process based on field evaluation. As a third example, a visual element that appears similarly in multiple positions in the panorama 12 may result in an incorrect registration of fields 18. For example, a black-and-white polka-dot pattern may present a large number of high-contrast visual elements in the fields, but registering fields 18 using the polka-dots as landmarks 22 may give rise to many types of registration errors, resulting in an incorrect stitching 22 that skews the resulting panoramic field 24.

As a fourth example, field evaluation techniques in general are computationally expensive processes. For example, comparing the entire content of each field 18 with the entire content of every other field 18 in the field set involves a large number of comparisons among a large volume of data. Thus, field evaluation techniques may consume a significant amount of computing resources, such as processor capacity, memory, and power and battery life, and may involve a significant duration that delays the presentation of the panoramic field 24 (and possibly suspends the operation of the device while the field evaluation is transpiring). Such disadvantages may be exacerbated by a large number of fields 18 comprising the panoramic field set; if respective fields 18 are large and/or high-resolution. Moreover, the components that are often included in devices 16 (e.g., comparatively small batteries and/or comparatively low-powered processors), thereby resulting in a protracted suspension of the operation of the field sensor and/or a significant drain of battery life.

Some field sensors endeavor to reduce these disadvantages by reducing the scope of computation involved in the field evaluation and/or improving the efficiency of the computational process. For example, a device 16 may be configured to, while capturing fields 18 of a panorama 12 with a field sensor 26, instruct the user 14 to capture the fields 18 in a particular manner, such as a right-to-left sweep across the horizontal axis of the panorama 12. Such instructions may enable the stitching 20 to presume, first, that each field 18 is to be registered to the right of the next field 18 in the sequence; and, second, that among two contiguous fields 18 in the panoramic field set, a landmark 22 appearing near the left margin of the first field 18 is likely to appear near the right margin of the second field 18, thereby reducing the area of each field 18 involved in the field evaluation. However, this variation may also introduce additional problems. As a first example, by constraining the process of capturing the fields 18 of the panorama 12 in a particular sequence, the device 16 may be incapable of generating panoramas 12 from other types of sequences of fields 18, such as a vertical sequence, a back-and-forth sequence, or an arbitrary sequence. As a second example, if the user 14 does not conform with the instructions (e.g., capturing fields 18 in a left-to-right sequence instead of a right-to-left sequence, or creating too much overlap between fields 18 that results in the appearance of landmarks 22 outside of the margins of the fields 18 involved in the comparisons to register the fields 18), the stitching 20 may simply fail to register the fields 18, and the device 16 may be unable to generate the panoramic field 24.

In view of these disadvantages of stitching processes based on computational field evaluation and registration, other techniques may be devised that reduce these disadvantages. Presented herein are techniques for configuring a device 16 to stitch fields 18 of a panoramic field set in order to generate a panoramic field 24.

Many contemporary devices include an orientation sensor, such as a compass, a gyroscopic sensor, or a set of accelerometers, that are configured to detect an orientation of the device. For example, such sensors are capable of determining the orientation of the device with respect to magnetic north, the horizontal attitude of the device, and the performance of tilt-based gestures. Moreover, the accuracy and efficiency of such devices are steadily improved, as evidenced by the growing availability and popularity of devices and applications that support "tilt-based" gestures, wherein rotating, tilting, or otherwise adjusting the orientation of the device provides rapid, accurate input for the application. As but one example, the growing set of "augmented reality" applications, wherein the device utilizes a back-facing field sensor and a display component in tandem to simulate a transparent device (overlaid with interesting visual information possibly related to the objects depicted on the display), evidence the sufficiency of orientation-based components in many scenarios.

In view of the growing availability of orientation sensors in portable devices, the present techniques involve the generation of a panoramic field 24 using a detected orientation of the fields 18 comprising the panoramic field set. In accordance with these techniques, a device 16 may include one or more orientation sensors that detect the orientation of the device 16 when a field 18 is captured with the field sensor 26, and that store the orientation with the field in the memory of the device 16. In order to stitch together the panoramic field 24, these techniques involve orienting each field 18 within a projection based on the orientation of the field 18. For example, using the concept of a sphere with the device 16 at the center, a stitching technique may position each field 18 within the sphere based on the orientation of the device 16 when the field 18 was captured. The projection may then be used as the basis for stitching together the panoramic field 24, based on the fields 18 oriented within.

Figure 2:
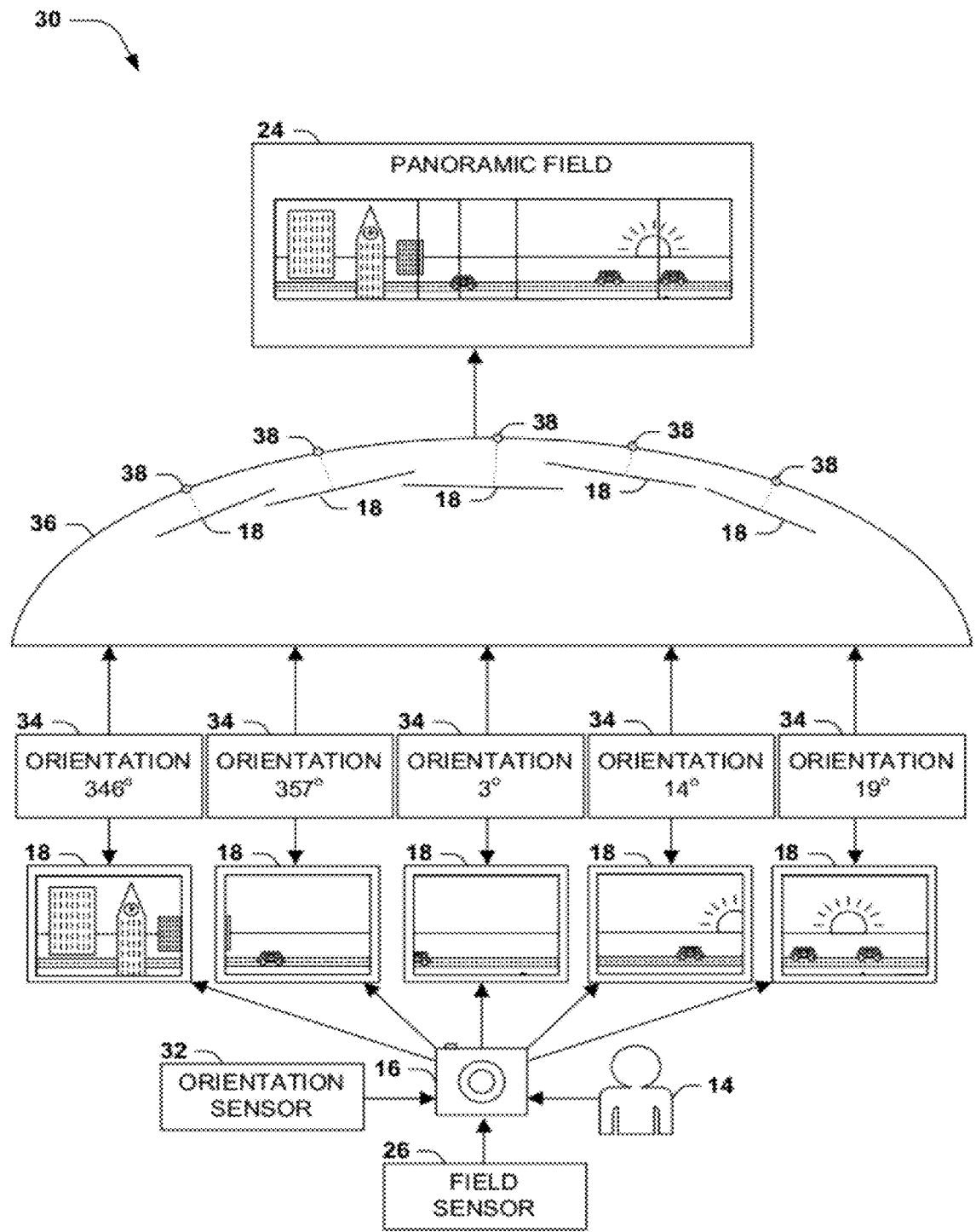
FIG. 2 is an illustration of an exemplary scenario featuring the generation of a panoramic field from a set of fields in accordance with the techniques presented herein.

FIG. 2 presents an illustration of an exemplary scenario 30 featuring a stitching of a panoramic field 24 according to the techniques presented herein. In this exemplary scenario 30, the user 14 captures fields 18 of a panorama 12, but in contrast with the exemplary scenario 10 of FIG. 1, in addition to a field sensor 26, this device 16 includes an orientation sensor 32, such as a compass, a gyroscopic sensor, or a set of accelerometers, that are configured to detect the orientation 34 of the device 16 when each field 18 is captured. The detected orientation 34 may be stored in the memory of the device 16 with each field 18 captured by the field sensor 26. When the user 14 requests to generate a panoramic field 24 from the fields 18, a projection 36, in this case comprising a curved surface (e.g., a two-dimensional portion of a circle or a three-dimensional portion of a sphere) is devised. Respective fields 18 are positioned within the projection 36 such that the orientation 34 of the field 18 matches the curvature of the projection 36 (e.g., such that the midpoint of each field 18, oriented according to the orientation 34, is parallel with the curvature 38 at the nearest point of the projection 36). The fields 18 oriented in this manner may be used to stitch together the panoramic field 24, which may be presented to the user 14. Again, it may be appreciated that while this exemplary scenario 30 depicts a camera configured to stitch together images into a panoramic image, the techniques depicted herein are applicable to many types of devices 16 utilizing many types of field sensors 26 to generate panoramic fields 24 from a set of fields 18.

The panoramic field generating techniques presented herein (such as the results presented in the exemplary scenario 30 of FIG. 2) may present some advantages over other techniques, including the field evaluation technique illustrated in the exemplary scenario 10 of FIG. 1. As a first example, the panoramic field 24 stitched together in this manner may be less susceptible to problems that may arise from the visual content of the fields 18, such as gaps between successive fields 18, inapplicable registration among fields 18 lacking landmarks 22 (e.g., featureless fields 18 of open sky), and the incorrect identification of similar but distinct visual elements in multiple fields 18 as a landmark 22 to be used for registration. As a second example, the device 16 does not constrain the user 14 to capture fields 18 in any particular sequence or order, and the user 14 may collect the fields 18 in any desired manner, including an arbitrary capturing of fields 18 across the panorama 12 (e.g., simply waving a videocamera over the panorama 12). As a third example, the orientation of fields 18 based on the detection and use of the orientation 34 may comprise a significantly less computationally expensive process than registration using field evaluation. Thus, the panoramic field 24 may be generated rapidly on commodity hardware (e.g., a low-powered processor and a small amount of memory) and with a modest use of battery power, which may represent distinct advantages in the field of devices 16 having commodity components. These and other advantages may be achieved through the implementation of the techniques presented herein.

Figure 3:
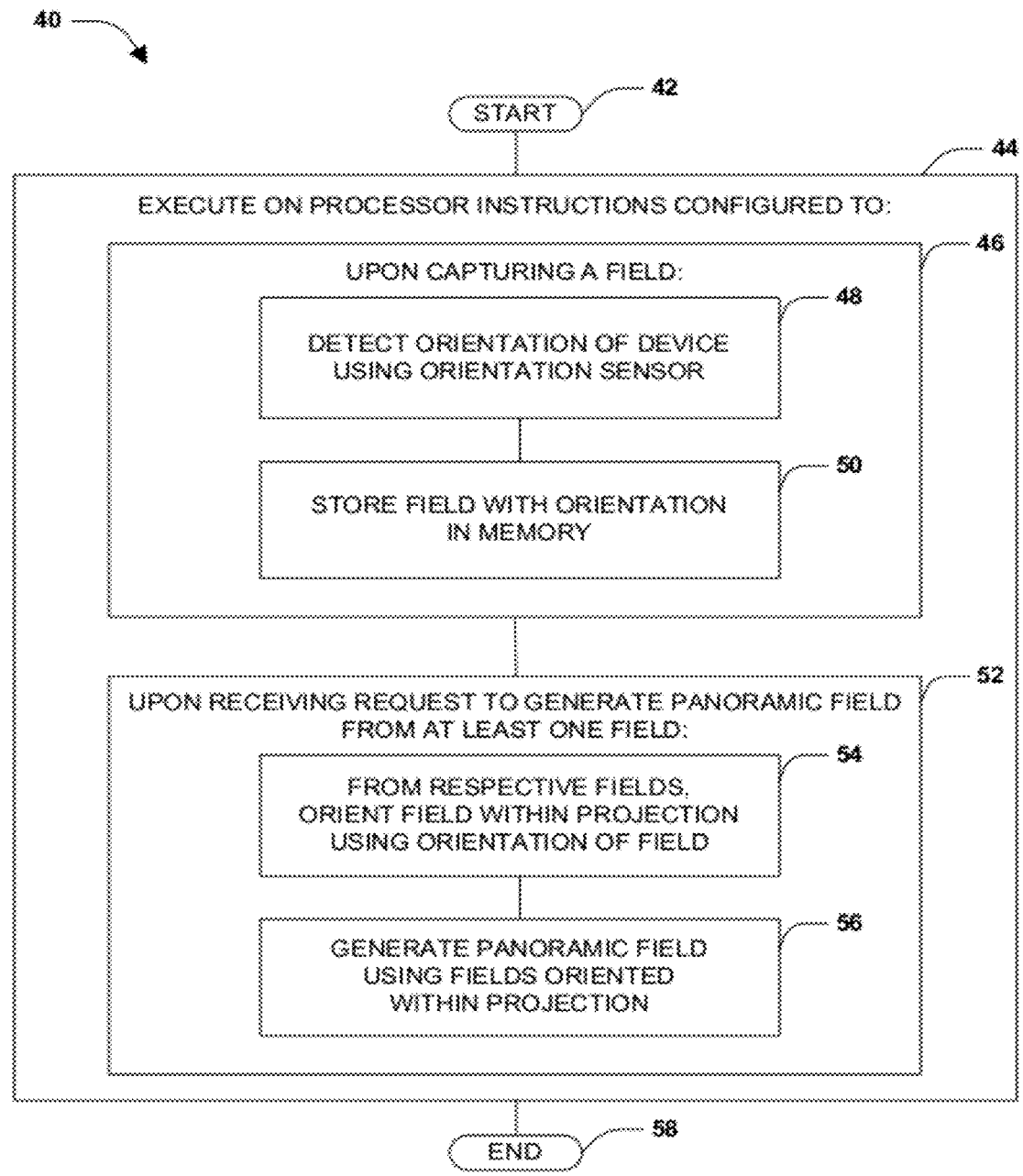
FIG. 3 is a flow chart illustrating an exemplary method of generating a panoramic field from a set of fields according to the techniques presented herein.

FIG. 3 presents a first embodiment of these techniques, illustrated as an exemplary method 40 of generating panoramic fields 24 using a device 16 having a processor, a memory, a field sensor 26, and an orientation sensor 32. The exemplary method 40 may be implemented, e.g., as a set of instructions stored on a memory of the device 16 (e.g., a system memory circuit, a platter of a hard disk drive, a solid-state storage device, or a magnetic or optical disc) that, when executed on the processor of the device 16, cause the device 16 to perform various aspects of the techniques presented herein. The exemplary method 40 begins at 42 and involves executing 44 the instructions on the processor. In particular, the instructions are configured to, upon the device 16 capturing 46 a field 18, detect 48 an orientation 34 of the device using the orientation sensor 32, and store 50 the field 18 with the orientation 34 in the memory. The instructions are also configured to, upon receiving 52 a request to generate a panoramic field 24 from at least one field 18, orient 54 respective fields 18 within a projection 36 using the orientation of the field 18, and generate 56 the panoramic field 24 using the fields 18 oriented within the projection 36. Having achieved the generation of the panoramic field 24 according to the techniques presented herein, the exemplary method 40 ends at 58.

Figure 4:
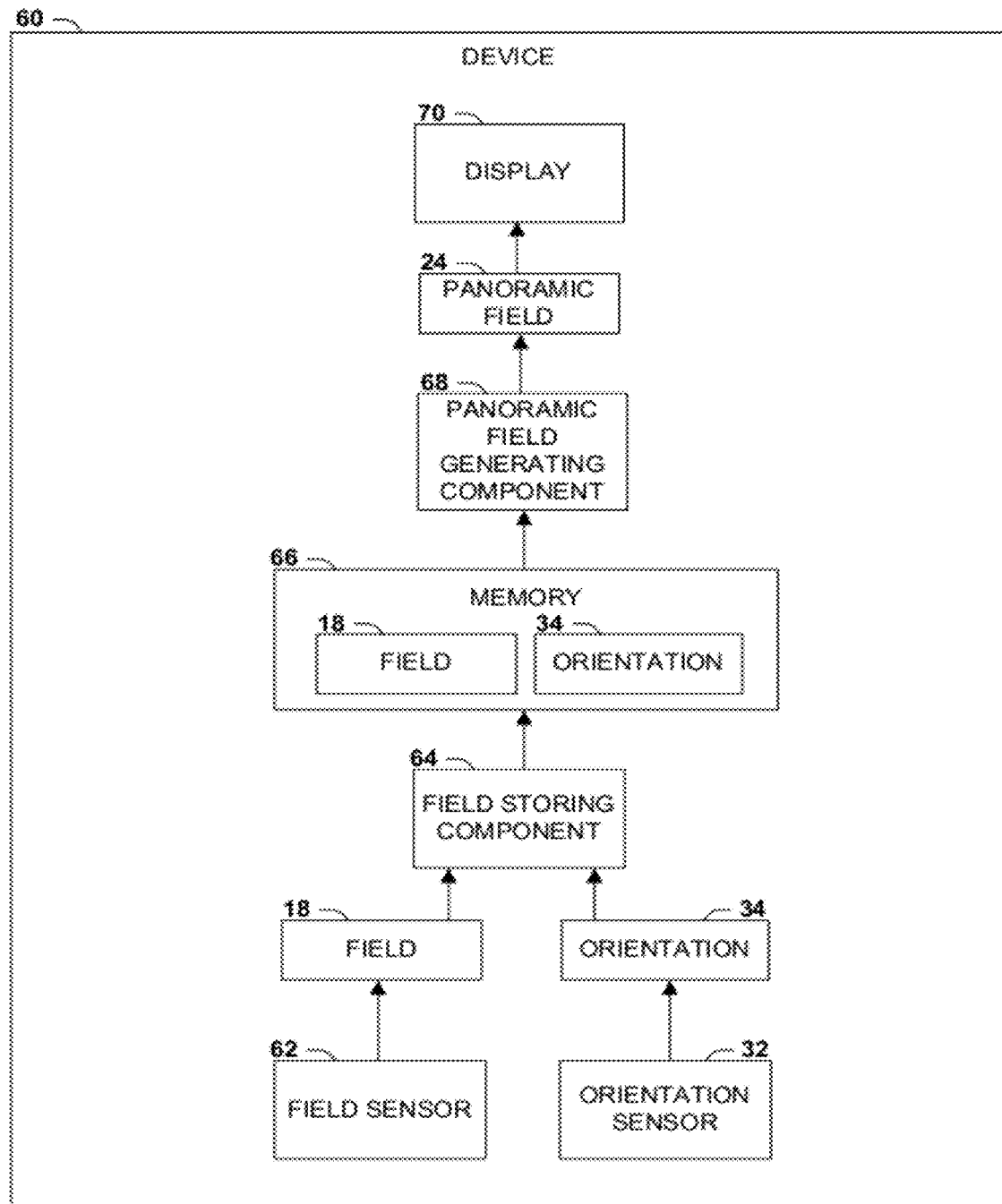
FIG. 4 is a component block diagram illustrating an exemplary field sensor configured to generate a panoramic field from a set of fields according to the techniques presented herein.

FIG. 4 presents a second embodiment of these techniques, illustrated as an exemplary scenario featuring an exemplary device 60 that is configured to generate panoramic fields 24. The respective components of the exemplary device 60 may be implemented, e.g., as hardware components (e.g., hardware circuits or devices), software components (e.g., a set of instructions stored in a memory component of the exemplary device 60 that, when executed on a processor of the exemplary device 60, cause the exemplary device 60 to perform various aspects of the techniques presented herein), or a hybrid thereof (e.g., a memory device embedding a set of processor-executable instructions, or a field-programmable gate array (FPGA) circuit programmed to perform at least one aspect of the presently disclosed techniques). The exemplary device 60 may be utilized by a user 14 to capture one or more fields 18 of a panorama 12, and the user 14 may request to generate a panoramic field 24 from one or more fields 18 of the panorama 12.

The exemplary device 60 of FIG. 4 comprises a field sensor 62 that is configured to capture fields 18 (e.g., a lens and a charge-coupled device (CCD)). The exemplary device 60 also comprises an orientation sensor 32 that is configured to detect an orientation 34 of the exemplary device 60 (e.g., a compass, a gyroscopic sensor, or a set of accelerometers). The exemplary device 60 also comprises a memory 66 that is configured to store fields 18 and orientations 32, and a display 70 that is configured to present a field 18 to a user 14. The exemplary device 60 also includes a field storing component 64 that is configured to, upon the field sensor 62 capturing a field 18, detect the orientation 34 of the exemplary device 60 using the orientation sensor 32, and store the field 18 with the orientation 34 in the memory 66. The orientation 34 may be stored in the memory 66 in many ways (e.g., embedded within the field 18; included as metadata packaged together with the field 18; as a separate metadata object, such as a metadata file, that is loosely associated with the field 8; or as an entry in a database referencing the field 18). The exemplary device 60 also includes a panoramic field generating component 68 that is configured to, upon receiving a request to generate a panoramic field 24 from at least one field 18, generate a projection 36 comprising the fields 18 respectively projected according to the respective orientations 34 of the fields 18, and present the panoramic field 24 on the display 70. Through the interoperation of these components, the exemplary device

60 of FIG. 4 may generate panoramic fields 24 from a panoramic field set in accordance with the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
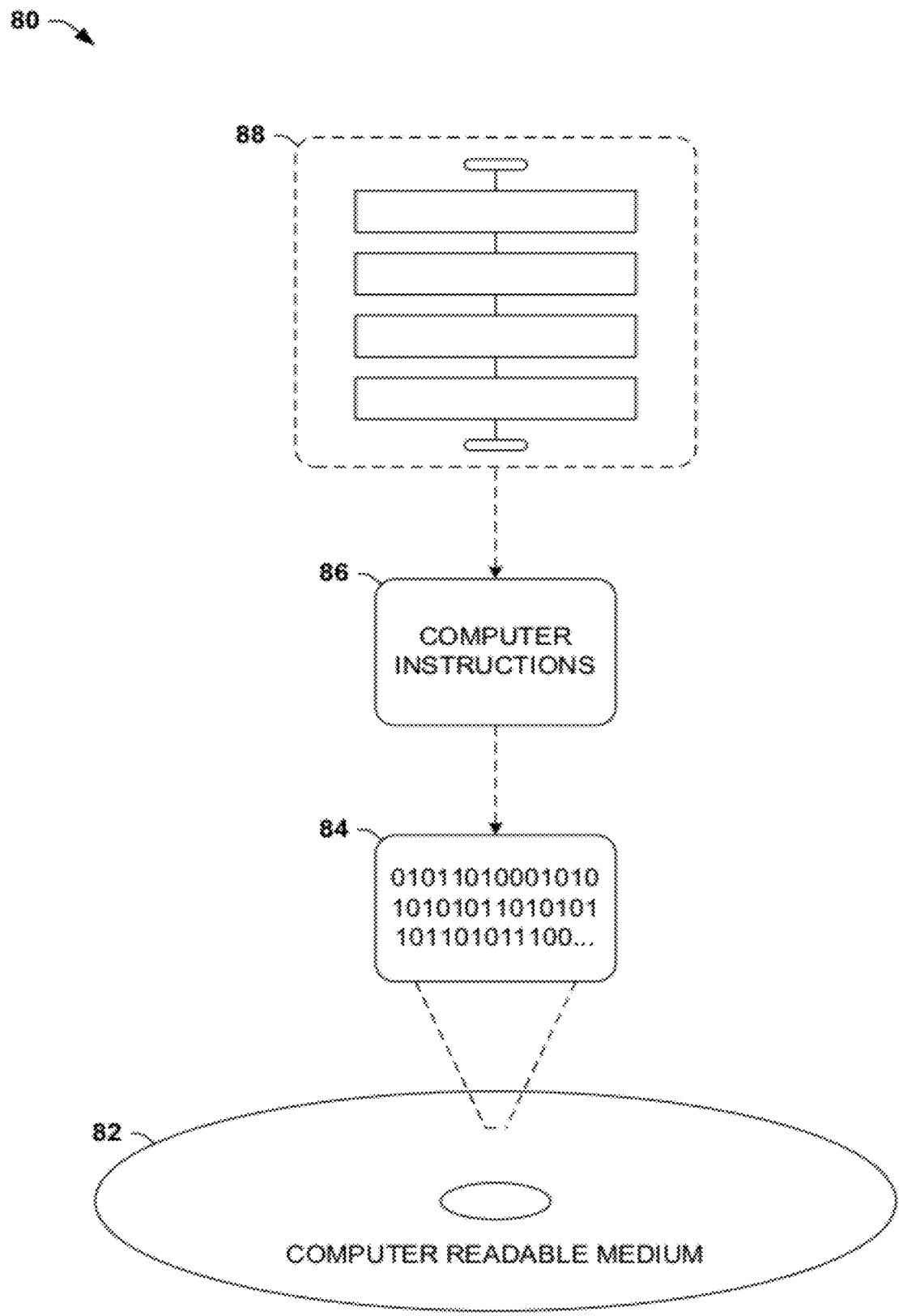
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 80 comprises a computer-readable medium 82 (e.g., a CD-R, DVD-R, or a platter of a hard disk drive), on which is encoded computer-readable data 84. This computer-readable data 84 in turn comprises a set of computer instructions 86 configured to operate according to the principles set forth herein. In one such embodiment, the processor-executable instructions 86 may be configured to perform a method of generating a panoramic field from a set of fields, such as the exemplary method 40 of FIG. 3. In another such embodiment, the processor-executable instructions 86 may be configured to implement a system for generating a panoramic field from a set of fields, such as an exemplary system executing within the exemplary device 60 in the exemplary device 60 of FIG. 4. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 40 of FIG. 3 and the exemplary system executing within the exemplary device 60 in the exemplary device 60 of FIG. 4) to confer individual and/or synergistic advantages upon such embodiments.

A first aspect that may vary among embodiments of these techniques relates to the scenarios wherein such techniques may be utilized. As a first example, the techniques may be utilized with many types of devices 16 and field sensors 26, including still image cameras and videocameras, each of which may be configured to capture images and/or video on a digital storage device, a recording film, or another medium. Alternative embodiments may include, e.g., a sonar sensor that is configured to detect a panoramic sonic profile of an area, and a thermal imaging system that is configured to detect a panoramic heat profile of an area. Additionally, some or all of these techniques may be implemented within the device 16 and/or by one or more devices interoperating with the device 16, such as a computer configured to receive the fields 18 from the device 16 and generate the panoramic field 24 therefrom. As a second example, the device 16 may be configured to capture many types of fields 18, such as still fields, discrete or continuous time-lapse fields 18 (e.g., a series of images comprising a time-lapse or continuous video), and even devices 16 capturing more than the domain, such as visible light, infrared and/or ultraviolet wavelengths, sound, and heat.

As a third example of this first aspect, many types of orientation sensors 32 may be utilized to detect the orientation 34 of the device 16 while capturing a field 18. For example, the orientation sensor 32 may comprise a compass configured to detect the orientation 34 with respect to the magnetic field of the Earth; a gyroscope that detects rotational physical forces applied to the device 16; or one or more accelerometers that detect linear physical forces applied to the device 16. The orientation sensor 32 may also include a location-based sensor configured to triangulate the location of the device 16 with respect to various types of transmitters, such as a global positioning service (GPS) service that triangulates the geological coordinates of the location of the device 16 with reference to global positioning satellites, or a communications device that triangulates the location of the device against the signal strength of one or more transmitters having fixed and known locations (e.g., a cellular communications component configured to triangulate with cellular communications towers or a wireless network component configured to triangulate with wireless network transmitters). Some embodiments may utilize a combination of such orientation sensors 32 to detect the orientation 34 of the device 16. Alternatively or additionally, some aspects of the field sensor 26 of the device 16 may be utilized to detect the orientation 34 of the device 32. For example, from a set of images captured by a camera, a determination of the location and/or orientation of the camera may be informed by the focal length of the lens of the camera, from which may be deduced the range of the camera from the subject; the radius of curvature of the resulting image, from which may be deduced the magnitude of zoom utilized to capture a particular subject; and the visible size of a landmark relative to a known size of the landmark, from which may be deduced the location and/or orientation 34 of the camera with respect to the landmark. As yet another example, various aspects of a field 18 may be utilized to determine the orientation thereof (e.g., for images captured outdoors during daylight hours, the orientation 34 of the image with respect to the sun may be deduced, in whole or in part, from the presence of the sun in the image, from a light gradient across the image indicating the relative position of the sun, or from the shapes and lengths of shadows within the image. Such deductions may be compared together with the known position of the sun in the sky at the time of the captured image to deduce the orientation of the camera.

As a fourth example of this first aspect, many types of projections 36 may be used during the stitching 20 of the panoramic field 24, including flat, curved, and spherical projections 36. As a fifth example of this first aspect, many types of panoramic fields 24 may be generated, such as a still panoramic field, a discrete or continuous time-lapse panoramic field (e.g., a panoramic video), and an interactive panoramic field, such as an arbitrarily zoomable panoramic field. These and other variations are presented in more detail herein, and those of ordinary skill in the art may devise many such scenarios wherein the techniques presented herein may be utilized.

A second aspect that may vary among embodiments of these techniques relates to the manner of capturing and storing the fields 18, and of stitching the fields 18 together into a panoramic field 24. In some such examples, the panoramic field 24 may be presented to the user 14 (e.g., upon the display 70 of the device 16, or upon a display of a separate device). For example, upon receiving from the user 14 a selected orientation (e.g., a selected location and/or orientation from which the user 14 requests to capture the panoramic field 24), the embodiment may present to the user 14 the fields 18 within the selected view orientation that are oriented according to the projection 36.

As a first example of this second aspect, additional processing techniques may be utilized while orienting the fields 18 within the projection 36. As a first such variation, in addition to orienting the fields 18 according to the orientation 34 stored with each field 18, the stitching 20 may also utilize an alignment of landmarks 22. Such landmarks 22 may comprise visible landmarks that may be matched by the human eye (e.g., a visible subject depicted in two or more images captured by a camera) and/or non-visible landmarks that may be identified through algorithmic analysis (e.g., distinctive data patterns that arise in two or more fields, and that enable a registration thereamong). Such variations may be advantageous, e.g., for achieving improved accuracy of the registration of the fields 34 than may be achieved only through the use of orientation 34, since the orientation sensor 32 of the device 16 may have a degree of inaccuracy and/or imprecision. Additionally, the field evaluation techniques may be conservatively applied; e.g., upon orienting two contiguous fields 18, a field evaluation technique may be utilized only in selective overlapping areas of the fields 18 to achieve an improved registration between the fields 18.

As a second variation of this first example of this second aspect, one or more field properties of one or more fields 18 may be adjusted with respect to corresponding field properties of one or more other fields 18 of the panoramic field 24. For example, several fields 18 oriented within a projection 36 may present a comparatively low light field, but a particular field 18 contiguous with such fields may have overexposed or may undesirably reflect the field sensor flash, and may present a contrastingly light field 18. Accordingly, the lightness level of the particular field 18 may be reduced to match the lightness levels of the other fields 18 to achieve consistency across the panoramic field 24. Additional field properties that may be adjusted for a particular field 18 include (e.g.) the hue, saturation, contrast, color depth, resolution, size, and zoom level of the field 18.

As a third variation of this first example of this second aspect, one or more fields 18 may be adjusted to match one or more dimensional properties of the projection 36. For example, the projection 36 may present a particular curvature (e.g., a one-dimensional curve along the projection 36, or a two-dimensional curve, such as a sphere), but respective fields 18 may exhibit a flat appearance, and stitching flat fields 18 into a one- or two-dimensionally curved projection 36 may result in visual anomalies, such as warping and discontinuities, among the fields 18 comprising the panoramic field 24. Therefore, for respective fields 18, at least one dimensional property of the field 18 may be adjusted with respect to a corresponding dimensional property of the projection 36. For example, a field processing technique may be utilized to render a curved appearance to respective fields 18, such that when the fields 18 are stitched together into the curved panoramic field 24, the curvature of the fields 18 improves the consistent continuity of the curved surface. Other dimensional properties that may be adjusted to adapt the fields 18 to a particular projection 36 include the size and/or shape of the field 18 and the degree of curvature (e.g., a sharply curved field 18 vs. a gently curved field 18).

Figure 6:
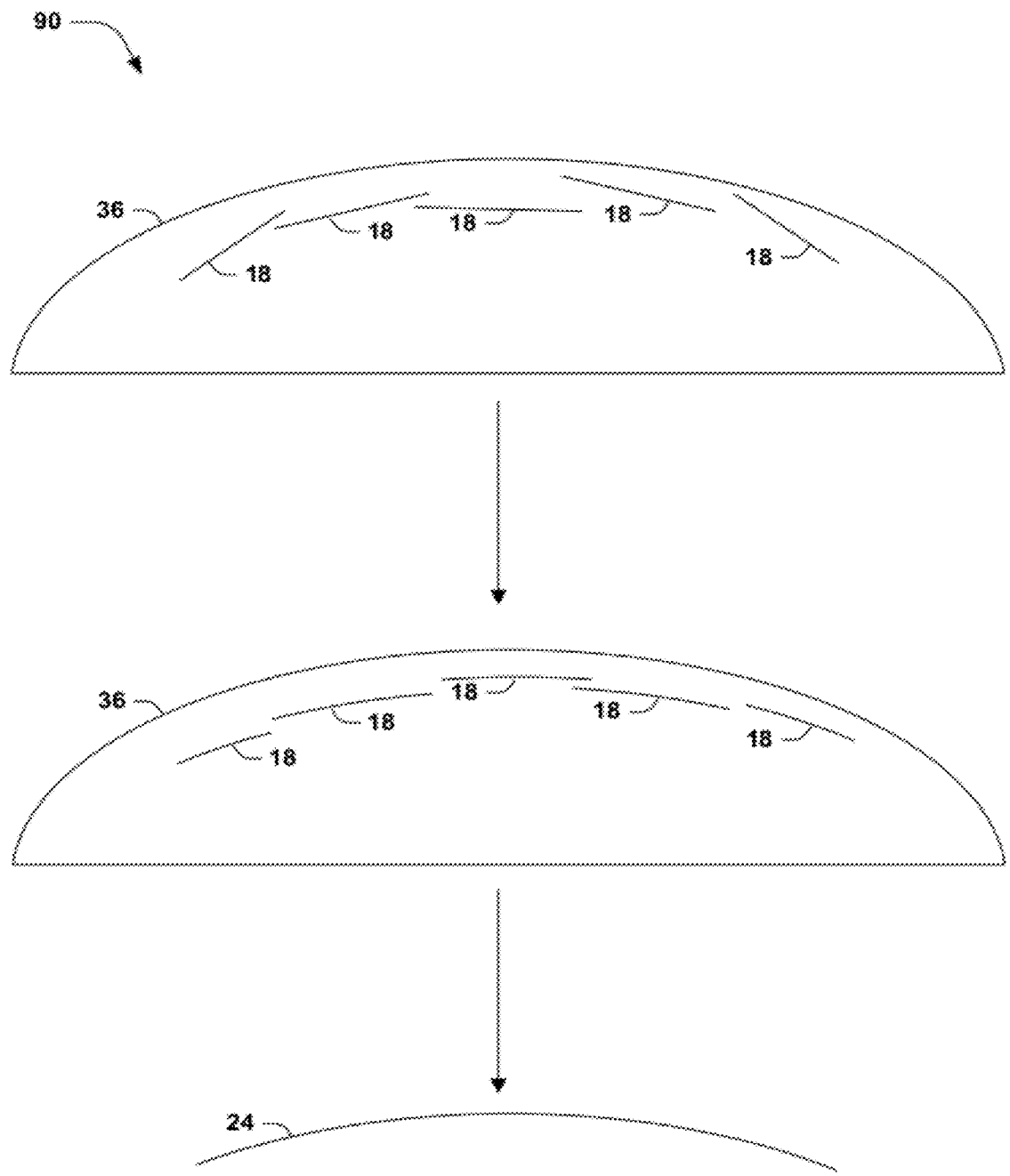
FIG. 6 is an illustration of an exemplary scenario featuring an adjustment of dimensional properties of respective fields to match the dimensional properties of a projection of a panoramic field.

FIG. 6 presents an illustration of an exemplary scenario 90 featuring an adjustment of a dimensional property of respective fields 18 to match a dimensional property of a projection 36. In this exemplary scenario 90, a set of fields 18 comprising a panoramic field 24 are oriented within a curved projection 36, but the curvature of the projection 36 is not fully suitable for the flat shapes of the fields 18. Instead, a field processing technique may be utilized to warp respective fields 18 into a rounded shape that matches the curvature of the portion of the projection 36 near which the field 18 is oriented. The resulting orientation of fields 18 within the curved projection 36 (illustrated in the middle of the exemplary scenario 90 of FIG. 6) demonstrate significantly improved overlap, and may result in a continuously curved panoramic field 24.

As a second example of this second aspect, the fields 18 may comprise respective frame of a motion video recording captured by a videocamera. For example, instead of carefully capturing many fields 18 across the panorama 12, a user 14 may slowly pan a videocamera over the panorama 12, and the frames of the video may be stitched together to generate the panoramic field 24. Additionally, the panoramic field 24 may be presented to the user 14 as a panoramic video comprising a sequence of panoramic field frames (where each frame, representing the fields 18 captured within a particular time range, comprises a projection 36 of the fields 18 having times within that time frame), and the user 14 may be permitted to watch the panoramic video in motion.

As a third example of this second aspect, respective fields 18 may be captured at significantly different times, such as time-lapse fields of a panorama 12 captured at different times of the day, season, or year. For example, the device 16 may include a chronometer, and the instructions may, upon capturing a field 18, detect the time of the field 18 and store the time with the field 18 in the memory 66. Accordingly, the panoramic field generating component 68 may stitch the fields 18 together according to one or more time ranges, each represented by a particular projection 36 (e.g., a first projection 36 for fields 18 captured within a first time frame, and a second projection 36 for fields 18 captured within a second time frame). This example may present potential advantages for the presently disclosed techniques. As a first such potential advantage, if the panoramic field set is captured by two or more devices 16 positioned in stationary and fixed locations that capture fields 18 over a period of time in a time-lapse manner, information may be shared and/or aggregated about the orientation of the fields 18 (e.g., an orientation 34 of a fixed device 16 while capturing a first field 18 at a first time may be presumed the same as the orientation 34 of the same fixed device 16 while capturing a second field 18 at a second time). As a second such potential advantage, the panoramic fields 24 may be presented together (e.g., presenting a scrollbar representing a timeline among the time-lapse fields), such that the user 14 may explore changes in the panorama 12 over time. As a third such potential advantage, if a field 18 from a sequence of fields 18 captured by a device 16 is missing or unusable (e.g., temporarily blocked from view), the field 18 may be interpolated from the consecutively preceding and following fields 18 in the sequence. For example, between a first field 18 captured at a first time and a second field 18 captured at a second time, a third field 18 captured in the time between the time of the first field 18 and the time of the second field 18 may be interpolated by averaging the contents of the first field 18 and the third field 18. As a fourth such potential advantage, the panoramic field 24 may present to the user 14 a list of time ranges corresponding to respective projections 36, and when the user 14 selects a selected time range, the device 16 may present to the user 14 the projection 36 comprising the fields 18 having a time within the selected time range.

As a fourth example of this second aspect, the device 16 may include one or more location sensors, such as a global positioning service (GPS) receiver or a triangulation component that triangulates the location of the device 14 based on the strengths of signals emitted from known, fixed locations (e.g., mobile phone towers and wireless access points). The device 16 may therefore, upon capturing a field 18, detect the location of the device 16 and store the location with the field 18. The location may be useful to achieve many features. As a first such variation, the location may be used to verify that the fields 18 of a panoramic field set were captured from approximately the same location (but with different orientations). As a second such variation, the location may be used to identify other fields 18 within a field library that were taken from the same location, and such fields 18 may be used to supplement the fields 18 of the panoramic field set (e.g., if a field 18 of the panoramic field set is missing or of inadequate quality, a field from substantially the same location and orientation may be retrieved from the field library to replace the missing or low-quality field).

Additional variations of this fourth example of this second aspect relate to fields 18 of the panorama 12 that were captured from different locations. For example, a user 14 may capture some fields 18 of a panorama 12, but may then move to a different location and capture additional fields 18 of the panorama 12. This relocation may be identified, e.g., as a set of fields 18 of a panoramic field set that are mutually captured at a particular location (e.g., the root location of a projection 36), and one or more additional fields 18 that are captured at a location having a view distance from the root location. In particular, the user 14 may capture a first field 18 that depicts a portion of the panorama 12, and may then move closer to a particular portion of the panorama 12 (e.g., closer to an object depicted in the panorama 12) and may capture a second field 18 that is comparatively zoomed-in with respect to the corresponding portion of the first field 18.

Fields 18 captured from locations other than the root location (e.g., the center) of the projection 36 may be included in a panoramic field 24 in various ways. The second field 18 may be useful in various ways in generating the panoramic field 24. As a first such variation, the second field 18 may add detail to the corresponding portion of the first field 18; e.g., the second field 18 may be scaled to generate an adjusted field that appears to have been captured at the root location (even if no such field 18 was captured). As a second such variation, the panoramic field 24 may be presented to the individual as an arbitrarily zoomable field (e.g., a panoramic field 24 that may be viewed at any zoom level selected by the user 14, and that blends the fields 18 captured at different levels of detail corresponding to different zoom levels), and the second field 18 may be presented upon zooming in on the corresponding area of the first field 18. As a third such variation, the panoramic field 24 may include a view indicator that indicates an availability, within the panoramic field 24, of a field 18 captured at a location having a view distance from the root location of the projection 36; and when a user 14 activates the view indicator, the second field 18 may be presented to the user 14. For example, clicking on a button labeled with "+" or a magnifying glass in a particular area of the panoramic field 24 may result in the presentation of a corresponding field 18 of the particular area of the panoramic field 24, captured from a location having a distance from the root location of the projection 36. The corresponding field 18 may even be of a different type (e.g., a video or sound profile embedded at a particular zoom area of a panoramic image, a high-resolution image presented at a particular zoom level of a panoramic video).

Figure 7:
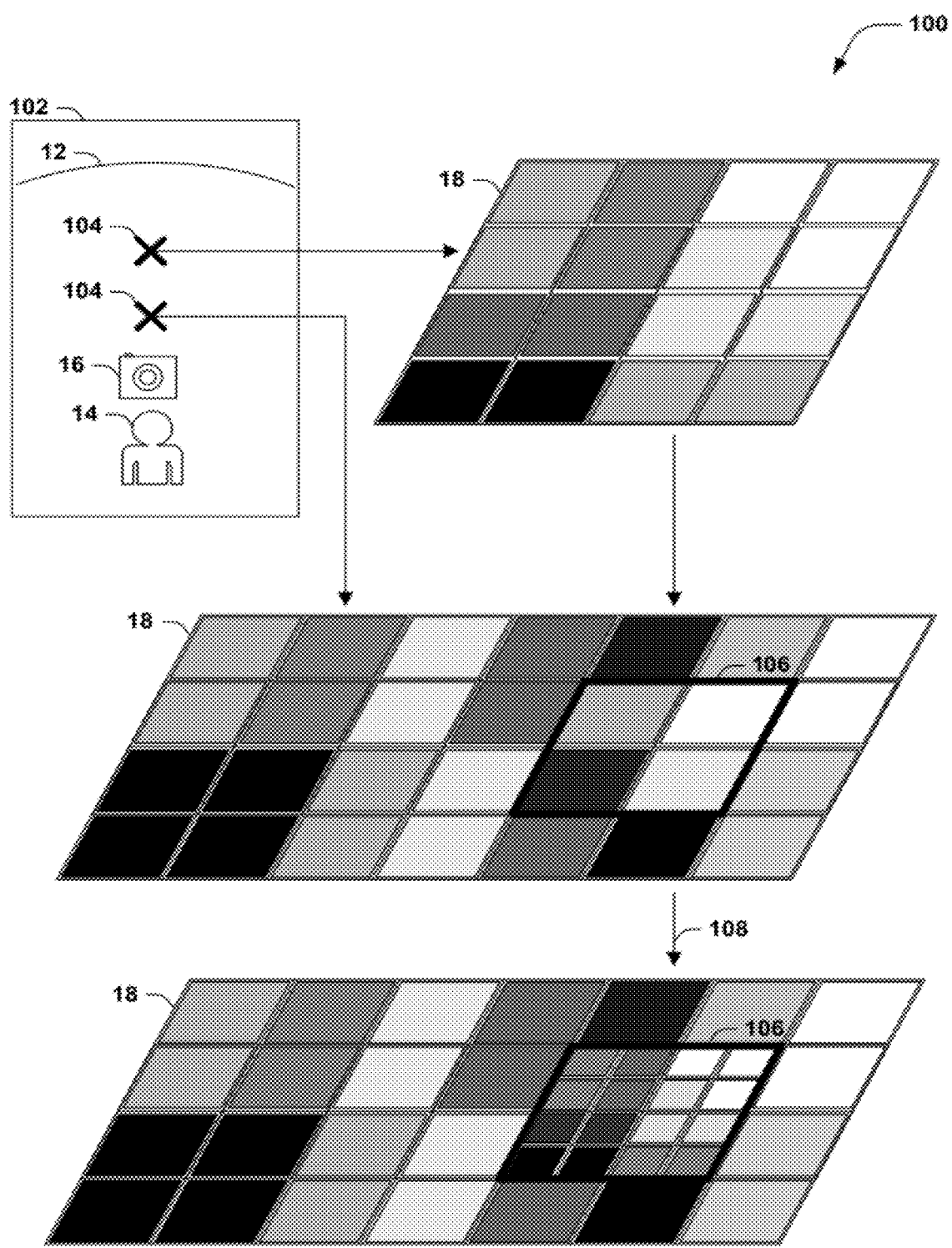
FIG. 7 is an illustration of an exemplary scenario featuring the incorporation of a first field into a second field within a panoramic field.

FIG. 7 presents a first exemplary scenario 100 featuring the incorporation of a first field 18 into a second field 18 within a panoramic field 24. In this exemplary scenario 100, a user 14 operates a device 16 to capture a first field 18 (depicted in the middle of FIG. 7) of a panorama 12 from a first location 104, and then approaches a portion of the panorama 12 to capture a second field 18 (depicted at the top of FIG. 7) from a second location 104 at a distance from the first location 104 (the latter representing the location 104 of the projection 36). While the first field 18 presents some pixels illustrating a particular area 106 of the panorama 12, the second field 18 presents some pixels illustrating the same particular area 106 of the panorama 12 at a higher resolution. Accordingly, the fields 18 may be combined into a portion of a panoramic field 24, wherein the pixels of the second field 18 depicting the location 106 are scaled 108 into the corresponding, comparatively low-resolution portion depicting the particular area 106 of the field 18. As a result of this scaling 108 and incorporation, a third field 18 (comprising at least a portion of the panoramic field 24) is generated comprising the pixels and resolution of the first field 18, but replacing the low-resolution pixels of the first field 18 in the particular area 106 with the corresponding, high-resolution pixels of the second field 18.

Figure 8:
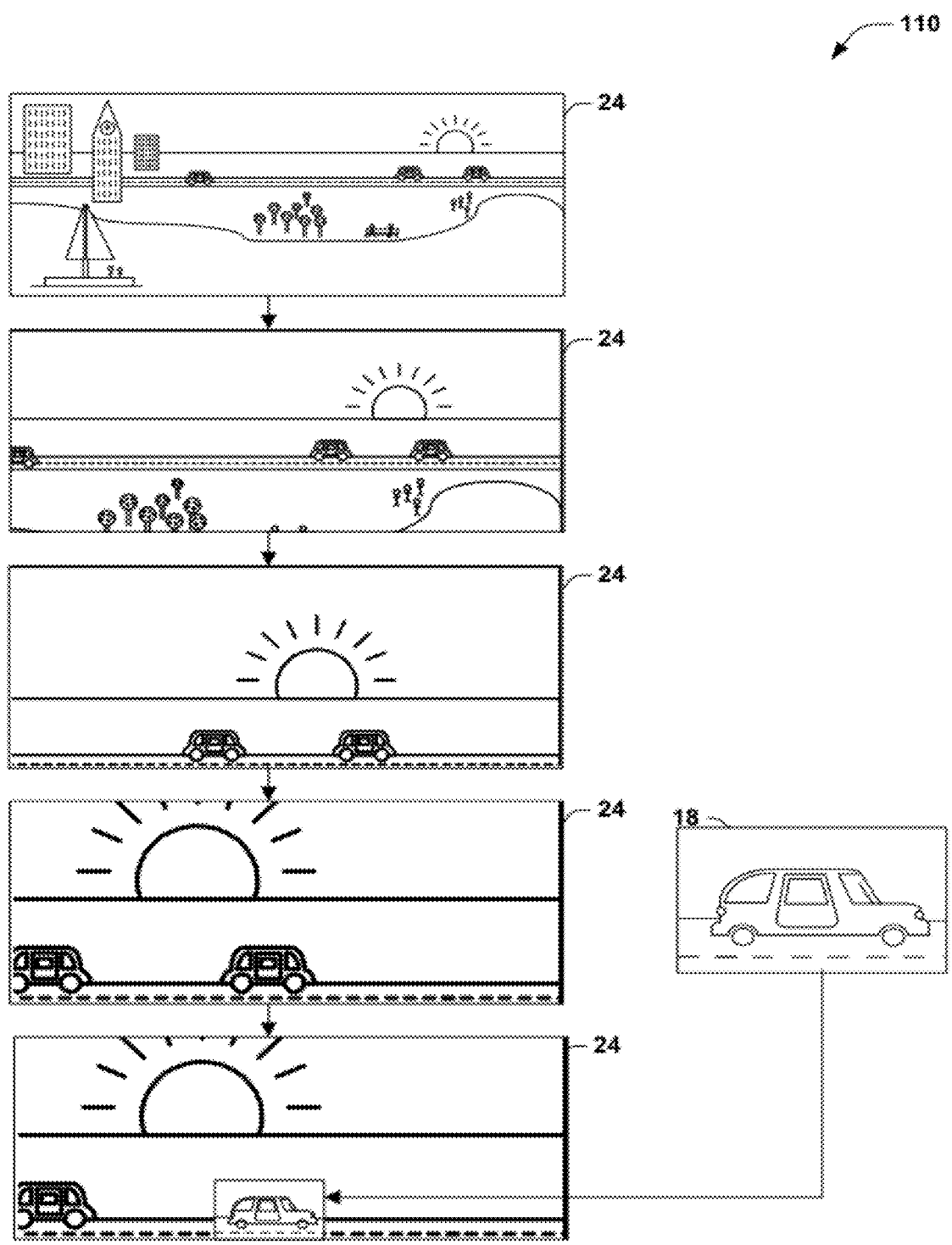
FIG. 8 is an illustration of an exemplary scenario featuring the incorporation of a first field into an arbitrarily zoomable panoramic field.

FIG. 8 presents a second exemplary scenario 110 featuring the incorporation of a first field 18 into a second field 18 within a panoramic field 24. In this exemplary scenario 110, a panoramic field 24 is presented to a user 14 at a first zoom level (e.g., a zoomed-out zoom level that presents the entire panoramic field 24 to the user 14. However, the user 14 may be permitted to select any arbitrary zoom level and zoom point within the panoramic field 24. Moreover, the device upon which the panoramic field 24 is being presented may render a smooth transition between the first zoom level and the second zoom level. In order to reduce pixelization at particular zoom levels, an embodiment of these techniques may, upon zooming in to an area of the panoramic field 24 that depicts a portion of a particular object, incorporate the second field 18 depicting the object 18. For example, the third automobile depicted in the first panoramic field 24 of FIG. 8 may at first appear at a comparatively low zoom level and with low resolution. The user 14 may issue a series of requests to zoom in on the object, each resulting in a smooth transition to an incrementally higher zoom level; but as the zoom level increases, the resolution of the panoramic field 24 may appear to be undesirably low, and the inadequacy of this level of detail upon zooming in on the panoramic field 24 may be disadvantageous. At a certain point, it may be desirable to begin including in the panoramic field 24 a second field 18 depicting a portion of the panorama 12 at a high zoom level. For example, upon zooming in on the third automobile in the panoramic field 24 of FIG. 8, a second field 18 depicting the third automobile may be scaled, registered and/or oriented, and inserted into the panoramic field 24. This variation may enable the inclusion of fields 18 of the panorama 12 captured at different locations 104 to be included in the panoramic field 24 a seamless, integrated manner. Those of ordinary skill in the art may devise many ways of generating and presenting the panoramic field 24 in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
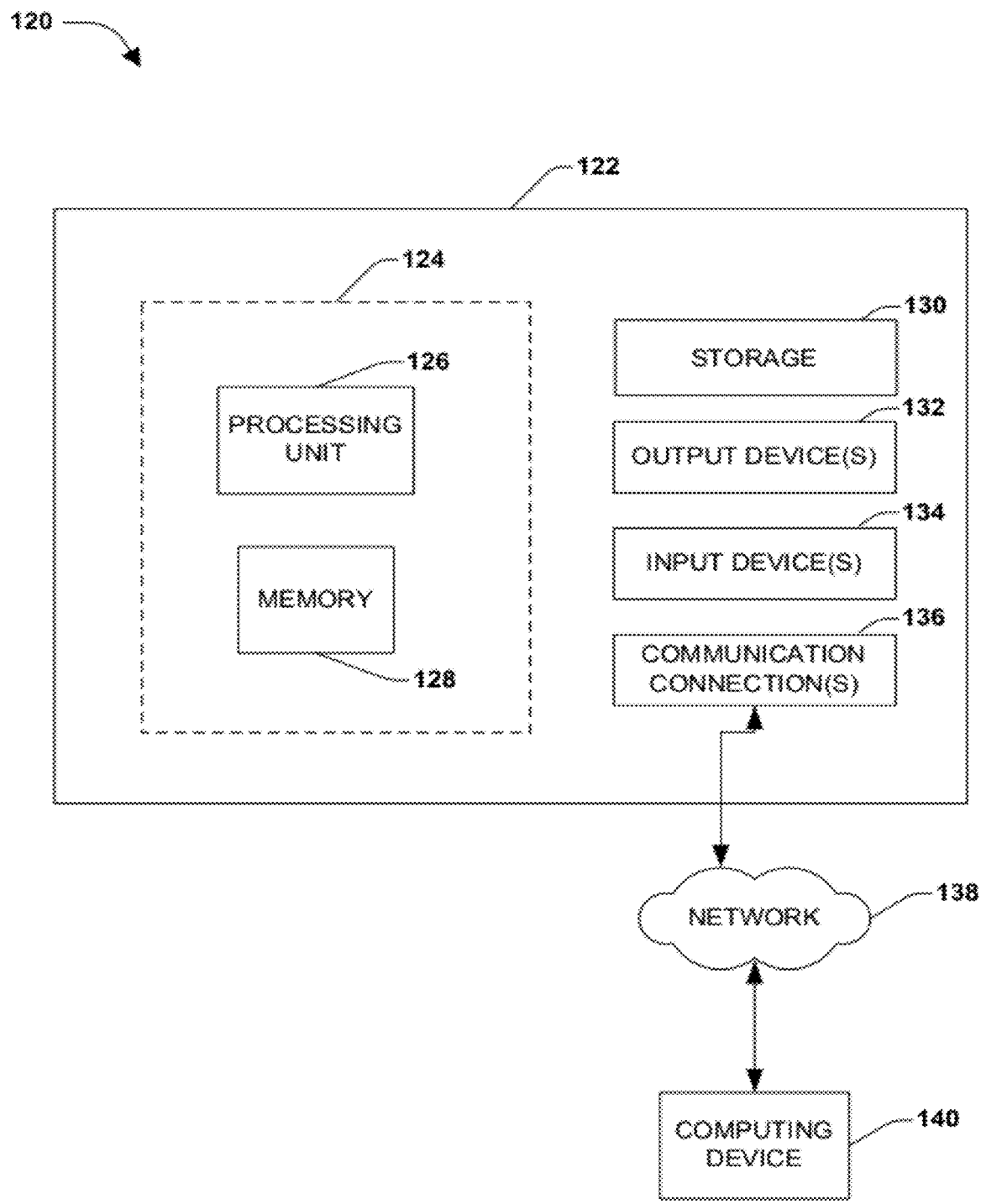
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 120 comprising a computing device 122 configured to implement one or more embodiments provided herein. In one configuration, computing device 122 includes at least one processing unit 126 and memory 128. Depending on the exact configuration and type of computing device, memory 128 may be volatile (such as RAM, for example), non-volatile (such as ROM, flash memory, etc., for example) or some combination of the two. This configuration is illustrated in FIG. 9 by dashed line 124.

In other embodiments, device 122 may include additional features and/or functionality. For example, device 122 may also include additional storage (e.g., removable and/or non-removable) including, but not limited to, magnetic storage, optical storage, and the like. Such additional storage is illustrated in FIG. 9 by storage 130. In one embodiment, computer readable instructions to implement one or more embodiments provided herein may be in storage 130. Storage 130 may also store other computer readable instructions to implement an operating system, an application program, and the like. Computer readable instructions may be loaded in memory 128 for execution by processing unit 126, for example.

The term "computer readable media" as used herein includes computer storage media. Computer storage media includes volatile and nonvolatile, removable and non-removable media implemented in any method or technology for storage of information such as computer readable instructions or other data. Memory 128 and storage 130 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 122. Any such computer storage media may be part of device 122.

Device 122 may also include communication connection(s) 136 that allows device 122 to communicate with other devices. Communication connection(s) 136 may include, but is not limited to, a modem, a Network Interface Card (NIC), an integrated network interface, a radio frequency transmitter/receiver, an infrared port, a USB connection, or other interfaces for connecting computing device 122 to other computing devices. Communication connection(s) 136 may include a wired connection or a wireless connection. Communication connection(s) 136 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 122 may include input device(s) 134 such as keyboard, mouse, pen, voice input device, touch input device, infrared field sensors, video input devices, and/or any other input device. Output device(s) 132 such as one or more displays, speakers, printers, and/or any other output device may also be included in device 122. Input device(s) 134 and output device(s) 132 may be connected to device 122 via a wired connection, wireless connection, or any combination thereof. In one embodiment, an input device or an output device from another computing device may be used as input device(s) 134 or output device(s) 132 for computing device 122.

Components of computing device 122 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 122 may be interconnected by a network. For example, memory 128 may be comprised of multiple physical memory units located in different physical locations interconnected by a network.

Those skilled in the art will realize that storage devices utilized to store computer readable instructions may be distributed across a network. For example, a computing device 140 accessible via network 138 may store computer readable instructions to implement one or more embodiments provided herein. Computing device 122 may access computing device 140 and download a part or all of the computer readable instructions for execution. Alternatively, computing device 122 may download pieces of the computer readable instructions, as needed, or some instructions may be executed at computing device 122 and some at computing device 140.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of generating panoramic fields using a field sensor having a processor, a memory, and an orientation sensor, the method comprising:
executing on the processor instructions configured to:
upon capturing a field:
detect an orientation of the field sensor using the orientation sensor and a location of the field, and
store the field with the orientation and the location of the field in the memory; and
upon receiving a request to generate a panoramic field of a subject from a projection using the at least one field stored in the memory:
for the respective fields, orient the field within the projection using the orientation and the location stored in the memory with the field;
present the panoramic field of the projection using the fields oriented within the projection; and
while presenting the panoramic field, upon detecting an availability of a second field depicting the subject from a second location having a nonzero view distance from the projection:
present a view indicator that indicates an availability of a second field that is not currently presented, wherein the second field depicts the subject from a second location having a nonzero view distance from the projection; and
upon receiving from the user an activation of the view indicator, present the second field instead of the panoramic field.

2. The method of claim 1:
the field sensor comprising a location sensor;
the instructions configured to, upon capturing a field, detect a location of the field using the location sensor;
storing the field in the memory comprising: storing the field with the location in the memory; and
orienting respective fields comprising: orienting the field within the projection using the orientation and the location of the field.

3. The method of claim 2:
the projection having a root location; and
at least one field having a location having a view distance from the root location.

4. The method of claim 3, comprising: generating the panoramic field comprising: for respective fields having a location having a view distance from the root location, scale the field to generate an adjusted field at the root location.

5. The method of claim 3, generating the panoramic field comprising: generating a panoramic field using the fields oriented within the projection and comprising, for at least one field having a location having a view distance from the root location, at least one zoomable area of the panoramic field.

6. The method of claim 1:
the field sensor comprising a chronometer;
the instructions configured to, upon capturing a field, detect a time of the field using the chronometer; and
storing the field in the memory comprising: storing the field with the time in the memory.

7. The method of claim 6:
at least one projection having a time range;
orienting the fields within the projection comprising: for respective projections, and for respective fields having a time within the time range of the projection, orient the field within the projection using the orientation of the field; and
generating the panoramic field comprising: for respective projections, generate at least one panoramic field using the fields oriented within the projection and having a time within the time range of the projection.

8. The method of claim 6:
a first field having the orientation and a first time;
a second field having the orientation and a second time; and
the instructions configured to, using the first field and the second field, interpolate a third field having the orientation and a time between the first time and the second time.

9. The method of claim 1:
a first field having a first orientation and depicting a landmark;
a second field contiguous to the first field within the projection depicting the landmark; and
orienting the fields within the viewing area comprising: aligning the landmark depicted in the first field with the landmark depicted in the second field.

10. The method of claim 1, at least one field comprising a frame of a video captured by a videocamera.

11. The method of claim 10:
respective fields stored in the memory with a time; and
generating the panoramic field comprising: generating a panoramic video comprising, for respective frames having a time, the fields comprising the projection having a time matching the time of the frame.

12. The method of claim 11, the instructions configured to present the panoramic video.

13. The method of claim 1:
respective fields having at least one field property; and
the instructions configured to adjust at least one field property of a first field to match at least one corresponding field property of a contiguous field within the projection.

14. The method of claim 1:
the projection having at least one dimensional property;
respective fields having at least one dimensional property; and
the instructions configured to adjust at least one dimensional property of the field to match a corresponding dimensional property of the projection.

15. The method of claim 1, comprising: upon receiving a selected view orientation, present the fields within the selected view orientation and oriented according to the projection.

16. The method of claim 15:
the panoramic field comprising at least one field having a location having a view distance from the projection; and
presenting the panoramic field comprising:
presenting the panoramic field scaled according to a zoom level arbitrarily selected by the user; and
upon receiving from the user a selected zoom level that includes at least one field within the selected view orientation and having a location having a view distance from the projection, display the field within the panoramic field scaled according to the selected zoom level.

17. The method of claim 15:
the panoramic field specifying at least two time ranges, each time range comprising at least one field having a time within the time range; and
presenting the panoramic field comprising: upon receiving from the user a selected time range, presenting the fields of the panoramic field having a time within the selected time range.

18. A field sensor device configured to generate panoramic fields, comprising:

a field sensor configured to capture fields;
an orientation sensor configured to detect an orientation of the field sensor;
a location sensor configured to detect a location of the field sensor;
a memory configured to store fields and orientations;
a display configured to present a field to a user;
a field storing component configured to, upon capturing a field:
  detect an orientation of the field sensor using the orientation sensor,
  detect a location of the field sensor using the location sensor, and
  store the field with the orientation and the location in the memory; and
a panoramic field generating component configured to, upon receiving a request to generate a panoramic field of a subject from the at least one field stored in the memory:
  generate a projection comprising the fields respectively projected according to the orientation stored in the memory with the field;
  present the panoramic field on the display; and
  while presenting the panoramic field:
    present a view indicator that indicates an availability of a second field that is not currently presented, wherein the second field depicts the subject from a second location having a nonzero view distance from the projection; and
    upon receiving from the user an activation of the view indicator, presenting the second field instead of the panoramic field.

19. A computer-readable memory device storing instructions that, when executed on a processor of a device having a field sensor and a chronometer, an orientation sensor, and a memory, cause the device to generate panoramic videos by:
upon capturing a field:
  detecting an orientation of the field sensor using the orientation sensor,
  detecting a time using the chronometer, and
  storing the field with the orientation and the time in the memory; and
upon receiving a request to generate a panoramic video from the at least one field stored in the memory:
  for respective fields, orienting the field within a projection using the orientation of the field;
  for respective selected times, generating a panoramic frame for the selected time using the fields oriented within the projection and associated with the selected time;
  combining the panoramic frames for the respective selected times to generate the panoramic video; and
  while presenting the panoramic field at the selected time:
    present a view indicator that indicates an availability of a second field that is not currently presented, wherein the second field depicts the subject at a second time that is different from the current time; and
    upon receiving from the user an activation of the view indicator, presenting the second field instead of the panoramic field.

20. The computer-readable memory device of claim 19:
the panoramic field comprising at least one field having a location having a view distance from the projection; and
presenting the panoramic field comprising:
  presenting the panoramic field scaled according to a zoom level arbitrarily selected by the user; and upon receiving from the user a selected zoom level that includes at least one field within the selected view orientation and having a location having a view distance from the projection, display the field within the panoramic field scaled according to the selected zoom level.

* * * * *